United States Patent
Tokumaru

(10) Patent No.: US 8,654,123 B2
(45) Date of Patent: Feb. 18, 2014

(54) CAD-SYSTEM PROJECTION METHOD, CAD-SYSTEM, AND RECORDING MEDIUM

(75) Inventor: Takayuki Tokumaru, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 615 days.

(21) Appl. No.: 12/017,852

(22) Filed: Jan. 22, 2008

(65) Prior Publication Data

US 2008/0180444 A1 Jul. 31, 2008

(30) Foreign Application Priority Data

Jan. 26, 2007 (JP) ................................. 2007-016421

(51) Int. Cl.
| | | |
|---|---|---|
| G06T 15/10 | (2011.01) | |
| G06T 15/00 | (2011.01) | |
| G06F 17/50 | (2006.01) | |
| G06K 9/36 | (2006.01) | |
| G06K 9/20 | (2006.01) | |
| G06F 19/00 | (2011.01) | |
| G06F 3/048 | (2013.01) | |
| A63F 9/24 | (2006.01) | |

(52) U.S. Cl.
USPC .............. 345/427; 345/419; 703/1; 382/276; 382/282; 700/95; 700/97; 700/98; 715/764; 715/765; 715/848; 715/852; 463/32; 463/34

(58) Field of Classification Search
USPC ................ 345/418–427, 581, 619, 621, 642; 703/1–2, 6–8; 700/95–107, 117, 118, 700/182; 715/700, 764, 765, 771, 781, 782, 715/788, 810, 823, 848–852; 463/30–34
See application file for complete search history.

(56) References Cited

U.S. PATENT DOCUMENTS

| | | | | |
|---|---|---|---|---|
| 5,689,435 A | * | 11/1997 | Umney et al. .................... 703/1 |
| 5,742,288 A | * | 4/1998 | Nishizaka et al. ............ 345/418 |
| 7,561,996 B2 | * | 7/2009 | Lu et al. ............................ 703/7 |
| 2007/0146362 A1 | * | 6/2007 | Yanagishita et al. .......... 345/420 |

FOREIGN PATENT DOCUMENTS

| | | |
|---|---|---|
| JP | A 2001-92865 | 4/2001 |
| JP | A 2006-92143 | 4/2006 |
| JP | A 2006-106938 | 4/2006 |

* cited by examiner

*Primary Examiner* — Wesner Sajous
*Assistant Examiner* — Andrew Shin
(74) *Attorney, Agent, or Firm* — Greer Burns & Crain, Ltd.

(57) ABSTRACT

To provide a CAD-system projection method for a further improvement in user convenience by preventing unnecessary dimension lines from being added when a projection drawing is created from a three-dimensional model. A pre-projected projection drawing is used to set, as objects to be projected, a three-dimensional element of a component in an edit state and a scale line added to the three-dimensional line, the three-dimensional element being a projection source of a two-dimensional element in the projection drawing. Thus, a three-dimensional element that is not in the edit state, a dimension line therefore, and a three-dimensional element that is not a projection source of the two-dimensional element in the projection drawing, and a scale line for the three-dimensional line are not projected. Consequently, it is possible to obtain a projection drawing that includes necessary projection lines and a dimension line therefore.

14 Claims, 12 Drawing Sheets

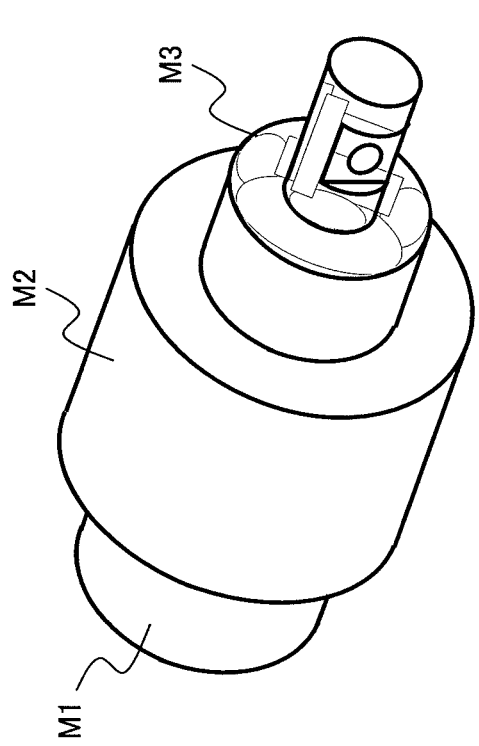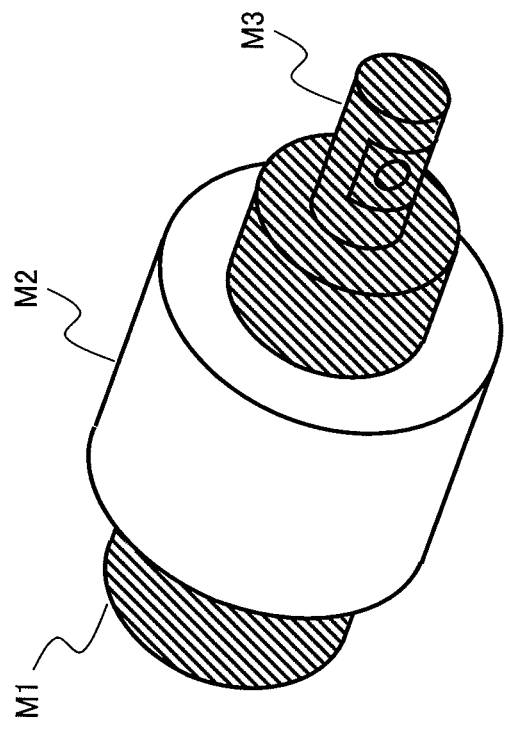
Fig. 3
Fig. 4

CAD-SYSTEM PROJECTION METHOD, CAD-SYSTEM, AND RECORDING MEDIUM

BACKGROUND OF THE INVENTION

1. Field of the Invention

The present invention relates to a CAD-system (Computer Aided Design system) projection method for adding dimension lines for two-dimensional elements in a two-dimensional space obtained by performing projection processing on a three-dimensional model including three-dimensional elements, a CAD system, and a recoding medium for executing the method in an appropriate system capable of reading information stored in the recoding medium.

2. Description of the Related Art

In order to add dimension lines to a two-dimensional drawing in a CAD system, a two-dimensional drawing is created from a three-dimensional model through projection processing and a user uses a tool (a dimension-line tool) for drawing dimension lines in the two-dimensional space of the two-dimensional drawing to specify the starts and ends of the dimension lines. Thus, every time the user modifies the three-dimensional model and obtains a two-dimensional drawing that includes the reflected modification through projection processing, he or she needs to modify the dimension lines as well. The modification must be made on each drawing, and thus, the load of the user is considerable.

In response, there is a CAD system that adds dimension lines to a three-dimensional model and that automatically adds dimension lines that are to be subjected to projection processing during projection processing to a two-dimensional drawing. According to the system, when the user modifies an assembly, component, or the like in a three-dimensional mode, he or she modifies dimension lines as well. This eliminates a need for modifying each drawing, at least, in the two-dimensional space of the two-dimensional drawing, thus resulting in an improvement in the user's work.

However, even the background technology has problems as follows. The problems will be described with reference to drawings.

Suppose an assembly drawing shown in FIG. 11 is created when an assembly including a component M1, a component M2, and a component M3 shown in FIG. 10 is designed. FIG. 11 is an assembly drawing obtained by performing projection processing on the components included in the assembly shown in FIG. 10, except for the component M2. When such an assembly drawing is to be created, a user specifies the component M1 and the component M3 or specifies exclusion of the component M2 during projection processing to perform projection processing. After creating the projection drawing shown in FIG. 11, the user adds dimension lines to a three-dimensional model, as shown in FIG. 12, by using a scale-line tool. When the user specifies the projection drawing shown in FIG. 11 and gives an instruction for projection processing, a projection drawing shown in FIG. 13 to which all dimension lines to be projected are added based on a projection direction of the three dimensional model shown in FIG. 12 is created. However, when the projection drawing shown in FIG. 11 is created, a dimension line for the component M2 excluded from objects to be projected (i.e., a dimension line corresponding to a circled dimension line in FIG. 13 and to a circled dimension line in the three dimensional model in FIG. 12) is also inserted into the projection drawing shown in FIG. 13, and this dimension line is an unnecessary line that is different from the user's intension. Thus, since all dimension lines that are added to the three-dimensional model and that are to be projected are added to the projection drawing based on the projection direction, there is a problem in that an unnecessary dimension line is added. In the above-described case, for convenience of description, one component is excluded from objects to be projected. However, during creation of an assembly drawing or component drawing including numerous components, assemblies, or geometric elements (e.g., points, lines, faces, and primitives), when a large number of components, assemblies, or geometric elements to which dimension lines that are to be excluded from objects to be projected are added exist, a projection drawing to which numerous unnecessary dimension lines are added is created. When such a projection drawing is created, the user currently deals with it by deleting the unnecessary dimension lines. Alternatively, the user deals with it by hiding the dimension lines on the three-dimensional model.

Meanwhile, Japanese Unexamined Patent Application Publication No. 2006-92143 discloses an automatic drawing-generation system. The automatic drawing-generation system includes an attribute-value database in which data regarding attribute values of a project are stored, a three-dimensional model database in which three-dimensional model data of the product are stored; a drawing-frame database in which drawing-frame data for each application are stored; projection-drawing generating means for generating a two-dimensional projection drawing by extracting a specified drawing-frame from the drawing-frame database and projecting a three-dimensional model extracted from the three-dimensional model database on the extracted drawing frame; a dimension database in which data regarding multiple scale-line elements are stored; combining means for extracting scale-line elements corresponding to the shape of the two-dimensional projection drawing from the dimension database, deforming the scale-line elements in accordance with the attribute values of the product, and combining the deformed scale-line elements and the two-dimensional projection drawing; and drawing outputting means for outputting, as a drawing, a two-dimensional projection drawing obtained by the combining of the combining means.

According to the automatic drawing-generation system, during the process in which the three-dimensional model is projected to generate the two-dimensional projection drawing, scale-line elements corresponding to the shape of the two-dimensional projection drawing are extracted from the dimension database and are deformed in accordance with the attribute values of the product, the deformed scale-line elements and the two-dimensional projection drawing are combined, and the drawing is output. Thus, when the projection drawing is automatically generated, only necessary dimension lines can be automatically shown in the two-dimensional space of the projection drawing. This can eliminate work for removing unnecessary dimension lines and adding necessary dimension lines, thus making it possible to achieve laborsaving to some extent in drawing generation. However, the scale-line elements in the dimension database are associated with two-dimensional elements, and thus, any scale element to be used must be added to the dimension database in advance. Thus, there are problems in that work for the processing needs to be done on all scale-line elements and it takes a tremendous amount of work. In other words, since individual drawings are involved in a projection drawing, work for setting a dimension line for each drawing and work involved in the modification become great burdens on the user.

SUMMARY

An object of the present invention is to overcome the problems described above, and to provide a CAD-system projection method for a further improvement in user convenience by preventing unnecessary dimension lines from being added when a projection drawing is created from a three-dimensional model.

In accordance with an aspect of the present invention, there is provided a CAD-system projection method for projecting a three-dimensional element in a three-dimensional model space to obtain a two-dimensional element in a two-dimensional space and recording information indicating an association relationship between the two-dimensional element and the projection-source three-dimensional element during the projection. The CAD-system projection method includes: a step of receiving a projection instruction; an edit-state determining step of determining whether or not a three-dimensional model in an edit state when the projection instruction is received is an assembly; a step of obtaining, when it is determined that the three-dimensional model is an assembly, a component belonging to the assembly; a step of obtaining, when it is determined that the three-dimensional model is a component, the component; a step of obtaining a projection drawing on which the three-dimensional model is projected and obtaining a two-dimensional element in the projection drawing; a step of searching for a three-dimensional element corresponding to the obtained two-dimensional element from the obtained component by using the information indicating the association relationship between the obtained two-dimensional element in the obtained projection drawing and the projection-source three-dimensional element; a step of searching for a dimension line added to the found three-dimensional element; and a step of projects the found three-dimensional element and the found dimension line as objects to be projected.

Thus, according to the present invention, a pre-projected projection drawing is used to set, as objects to be projected, a three-dimensional element of a component in an edit state and a scale line added to the three-dimensional line, the three-dimensional element being a projection source of a two-dimensional element in the projection drawing. As a result, a three-dimensional element that is not in the edit state, a dimension line therefore, and a three-dimensional element that is not a projection source of the two-dimensional element in the projection drawing, and a scale line for the three-dimensional line are not projected. Consequently, there is an advantage in that it is possible to obtain a projection drawing including necessary projection lines and a dimension line therefore.

The object in the edit state may be one component, multiple components, one assembly, and multiple assemblies.

The projection drawing is one type of two-dimensional drawing, and is a two-dimensional drawing obtained by projecting a three-dimensional model to a specified two-dimensional plane. The two-dimensional drawing is a drawing in which a two-dimensional element is placed on a two-dimensional plane.

The projection of the CAD system is performed by projecting a three-dimensional element in a three-dimensional model space to a specified two-dimensional plane to create a two-dimensional element on the two-dimensional plane (which may also be referred to as a "paper space").

An already-projected projection drawing may not only be designated by the user but also be automatically designated based on the three-dimensional element in the edit state or projection parameters. In order to obtain a projection drawing having dimension lines desired by the user, it is desired that the user designates an already-projected projection drawing. The designation is performed, at least, before the projection drawing is used, and, for example, the user designates the projection drawing when an instruction for the projection is issued.

The present invention can also be construed as a re-projection method for obtaining a projection drawing to which appropriate dimension lines are added by using an already-projected projection drawing and a three-dimensional model to which dimension lines are added.

In accordance with another aspect of the present invention, there is provided a CAD-system projection method for projecting a three-dimensional element in a three-dimensional model space to obtain a two-dimensional element in a two-dimensional space and recording information indicating an association relationship between the two-dimensional element and the projection-source three-dimensional element during the projection. The CAD-system projection method includes: a step of receiving a projection instruction; an edit-state determining step of determining whether or not a three-dimensional model in an edit state when the projection instruction is received is an assembly; a step of obtaining, when it is determined that the three-dimensional model is an assembly in the edit-state determining state, a component belonging to the assembly; a step of obtaining, when it is determined that the three-dimensional model is a component in the edit-state determining step, the component; a step of obtaining a projection drawing on which the three-dimensional model is projected and determines whether or not the projection drawing is obtained; a step of projecting, as objects to be projected, a three-dimensional element and a dimension line of the obtained component, when it is determined that the projection drawing cannot be obtained; a step of obtaining a two-dimensional element on the obtained projection drawing, when it is determined that the projection drawing is obtained; a step of searching for a three-dimensional element corresponding to the obtained two-dimensional element from the obtained component by using information indicating an association relationship between the obtained two-dimensional element in the projection drawing and the projection-source three-dimensional element; a step of searching for a dimension line added to the found three-dimensional element; and a step of projecting the found three-dimensional element and the found dimension line, as objects to be projected.

Thus, according to the present invention, when the projection drawing used for projection cannot be obtained, an obtained component that is a three-dimensional model in a selected state is directly subjected to projection processing as an object to be projected. Thus, there are advantages. That is, when the projection drawing can be obtained, a projection drawing to which a dimension line is appropriately added can be obtained. On the other hand, even when the projection drawing cannot be obtained, a projection drawing to which a dimension line is added can be obtained.

As needed, the CAD-system projection method according to the present invention includes: a step of recording information indicating an association relationship between a three-dimensional model in an edit state and a projection drawing during projection; and a projection-drawing identifying step of identifying, upon receiving a projection instruction, a projection drawing from information indicating an association relationship between the three dimensional model and the projection drawing based on the three-dimensional model in the edit state. The projection drawing identified in the projection-drawing identifying step is obtained.

As described above, according to the present invention, the information indicating the association relationships between three-dimensional model in the edit state and the projection drawing is recorded during projection, and based on the recorded information indicating the association relationship, the projection drawing corresponding to the three-dimensional model in the edit state for the next projection is identified. Thus, there is an advantage in that it is possible to eliminate the user's work for performing selection from multiple projection drawings. Even if one projection drawing cannot be identified and there are multiple projection drawings that have been identified, the work for the selection is reduced, since the number of projection drawings to be selected by the user is reduced compared to all projection drawings. For example, corresponding projection-drawing identification information (such as a projection-drawing file name) is associated with identification information of the three-dimensional model in the edit state and is recorded in CAD data.

As needed, the CAD-system projection method according to the present invention includes: a step of determining whether or not a dimension line is added to a three-dimensional element of a three-dimensional model in an edit state, and a step of not executing the processing subsequent to the edit-state determining step when it is determined that a dimension line is not added to the three-dimensional element of the three-dimensional model in the edit state.

As described above, according to the present invention, a determination is made as to whether or not a dimension line is added to a three-dimensional model in an edit state which serves as a candidate to be projected, and when a dimension line is added to the three-dimensional model, the processing subsequent to the edit-state determining step is performed and the projection processing described above is performed. However, when no dimension line is added to the three-dimensional mode, a first action in which the processing subsequent to the edit-state determining step is not performed and the projection processing itself is not performed, a second action in which known general projection processing is performed without performing the processing subsequent to the edit-state determining step, or a third action in which the processing in the edit-state determining step is performed and an obtained component is projected at a point of time when the component is obtained is taken. Thus, there is an advantage in that it is possible to avoid searching for a three-dimensional element and a dimension line added to the three-dimension element from a two-dimensional element using a projection drawing. It is possible to avoid unnecessary processing and to give a response quickly. For projection when any dimension line is not added to the three-dimensional mode, it is efficient to perform general projection processing.

Although the present invention has been described as the method, it can also be realized as a system and a program, as is apparent to those skilled in the art.

The summary of the invention does not necessarily describe all essential features of the present invention. The present invention may also be a sub-combination of the features described above.

BRIEF DESCRIPTION OF THE DRAWINGS

FIG. 3 shows an example of a three-dimensional model in the CAD system and its assembly tree according to the first embodiment of the present invention;

FIG. 4 is an example in which components for partial projection processing are specified in the three-dimensional model shown in FIG. 3;

DESCRIPTION OF THE PREFERRED EMBODIMENTS

Figure 1:
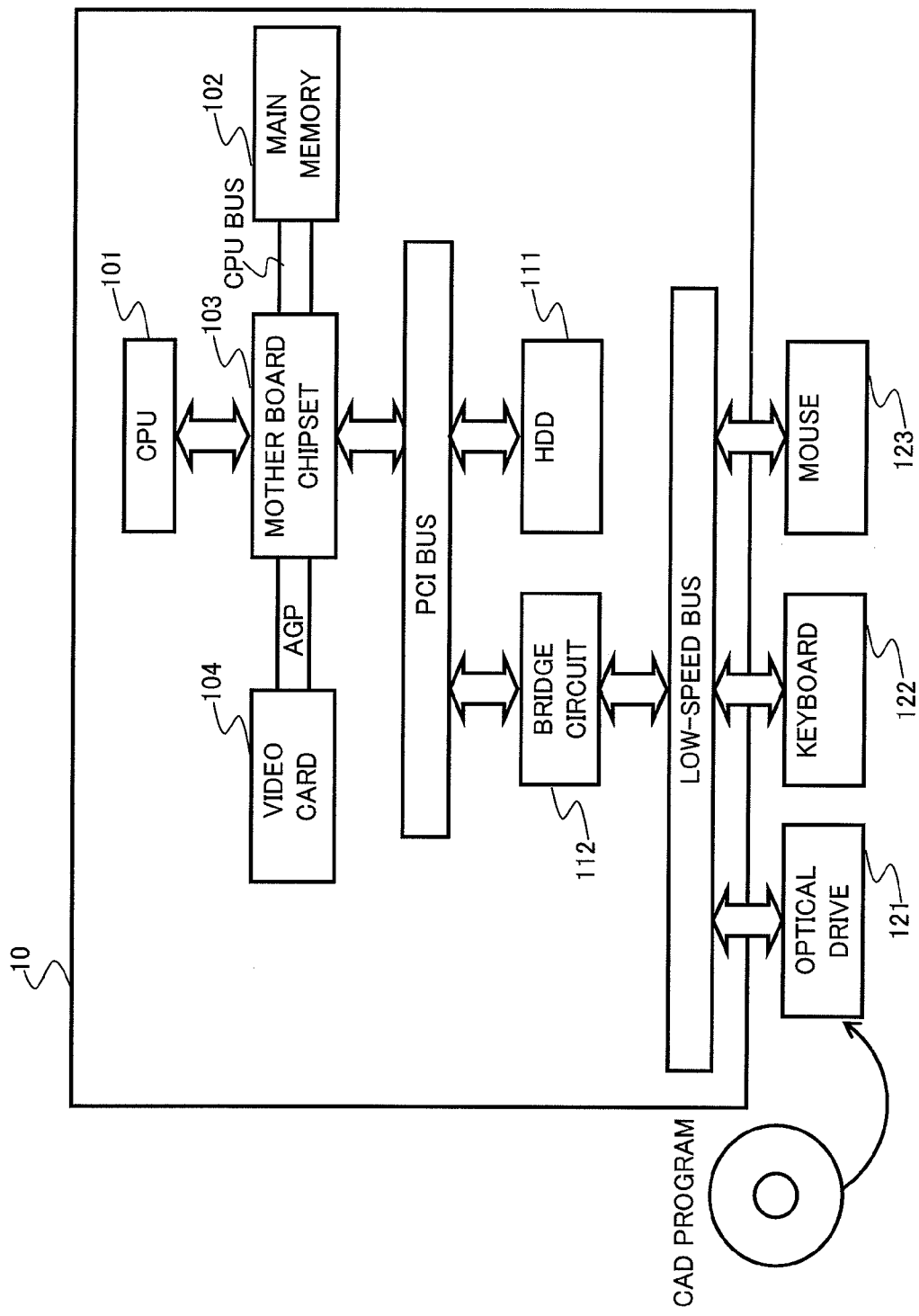
FIG. 1 is schematic diagram of the hardware configuration of a computer according to a first embodiment of the present invention.

Embodiments of the present invention will now be described in detail with reference to the drawings. The present invention can be carried out in many different modes. Thus, the embodiments should not be construed based only on the description herein. Throughout the embodiments, the same elements are denoted by the same reference numerals.

While the embodiments will be described in conjunction with a system, the present invention can also be implemented as a program and a method that are applicable to a computer, as is apparent to the so-called "those skilled in the art". The present invention can also be implemented in the forms of embodiments of hardware, software, or software and hardware. The program can be recorded on any computer readable medium, such as hard disk, CD-ROM, DVD-ROM, optical storage device, magnetic storage device, or the like. In addition, the program can be recorded on another computer through a network.

(First Embodiment of the Present Invention)
[1. System Configuration]
[1.1 Hardware Configuration]

FIG. 1 is a schematic diagram of the hardware configuration of a computer that implements a CAD system according to one embodiment of the present invention.

As shown in FIG. 1, a computer 100 that implements a CAD system includes a CPU (central processing unit) 101, a main memory 102, a motherboard chipset 103, a video card 104, a HDD (hard disk drive) 111, a bridge circuit 112. An optical drive 121, a keyboard 122, and a mouse 123 are connected to the computer 100.

The main memory 102 is connected to the CPU 101 via a CPU bus and the motherboard chipset 103. The video card 104 is connected to the CPU 101 via an AGB (accelerated graphics port) and the motherboard chipset 103. The HDD 111 is connected to the CPU 101 via a PCI (peripheral component interconnect) bus and the motherboard chipset 103.

The optical drive 121 is connected to the CPU 101 via a low-speed bus, the bridge circuit 112 for the low-speed bus and the PCI bus, the PCI bus, and the motherboard chipset 103. With a similar connection configuration, the keyboard 122 and the mouse 123 are also connected to the CPU 101. The optical drive 121 is a drive for reading (or reading and writing) data by irradiating an optical disc with laser light, and corresponds, for example, a CD-ROM drive or a DVD drive.

FIG. 1 is merely one example schematically showing the hardware configuration of a computer that implements a CAD system according to the present embodiment, and various other configurations can also be employed as long as the present embodiment is applicable. In addition, the CAD system may be configured as a centralized form, a distributed form, or a standalone form, as is known.

The CAD system can be implemented by the so-called "installing", that is, reading an optical medium, on which a CAD program is stored, from the optical drive 121 to the computer 100 and copying it to the HDD 111 so that the copied CAD program can be loaded to the main memory 102 (the exemplified installing in this case is merely an example). When the user issues an instruction for starting the CAD system to an OS (operating system) that controls the computer, the CAD program is loaded to the main memory 102 and is started.

[1.2 Elements of System Configuration]

Figure 2:
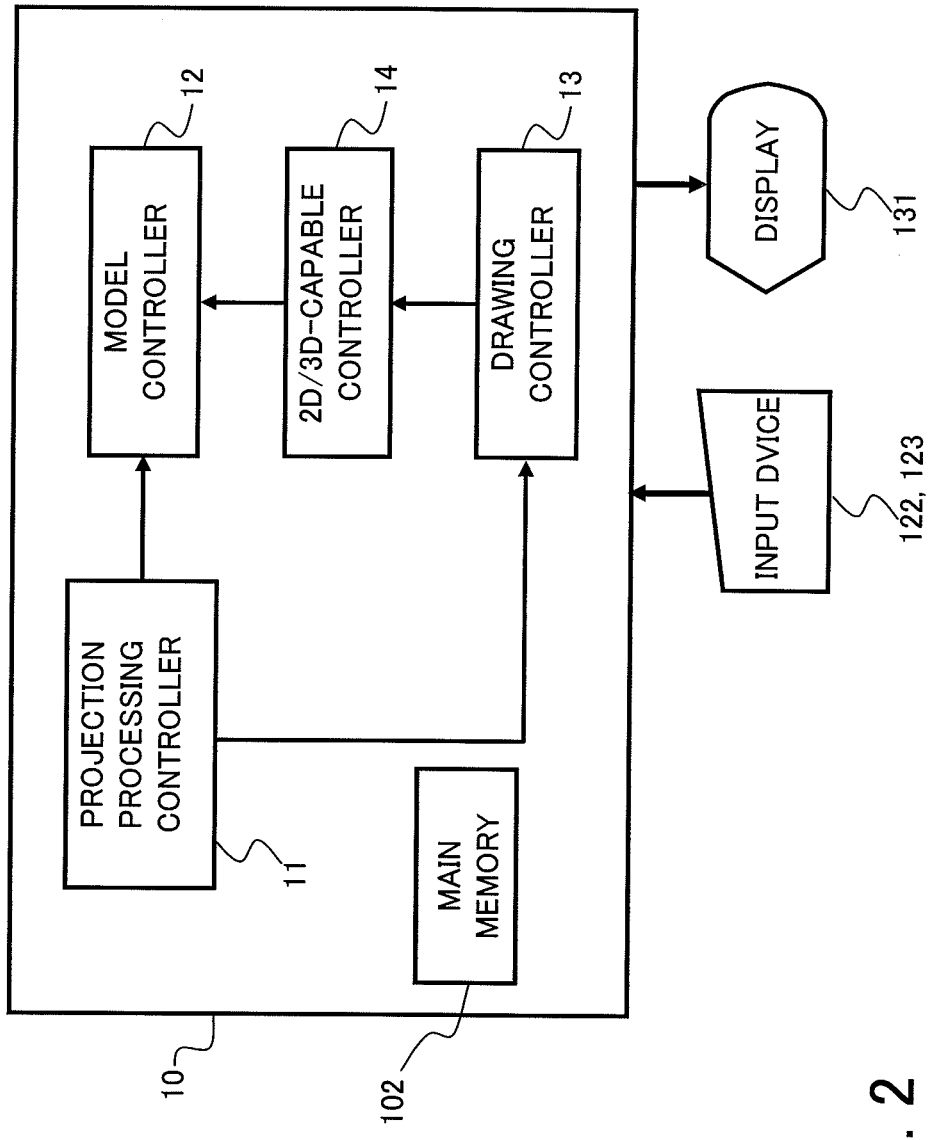
FIG. 2 is a block diagram of a module of a CAD system according to the first embodiment of the present invention.

FIG. 2 is a block diagram of a module of the CAD system according to the present embodiment. A CAD system 10 includes the computer 100 in which a projection processing controller 11, a model controller 12, a drawing controller 13, a 2D/3D-capable controller 14, and a main memory 102. As peripheral devices, for example, input devices 122 and 123, such as a keyboard and mouse or a touch panel, and a display 131 are provided.

The projection processing controller 11 has a function for executing projection processing in accordance with a projection processing request from the user. Since general projection processing is a known and commonly-used technology, the description thereof is omitted. Specifically, however, the projection processing controller 11 projects a three-dimensional model corresponding to a two-dimensional element in a two-dimensional space corresponding to a specified three-dimensional model and also dimension lines associated with the three-dimensional model.

The model controller 12 has a function for controlling the three-dimensional model. Specifically, the model controller 12 receives an operation by the user and performs corresponding processing in a three-dimensional model space to express a processed three-dimensional model. The model controller 12 realizes reading, editing, writing, and so on of the three-dimensional model. The model controller 12 can obtain information regarding an arbitrary three-dimensional model topology and update the obtained information, or can generate information. For example, when the user performs an operation for creating a line in the three-dimensional model, information regarding a three-dimensional model topology of the line is generated and drawn at a corresponding position, and further, when the line is moved, information regarding a three-dimensional model topology of the line is updated. Since the model controller 12 receives an operation from the user and thus can identify a component or assembly in an edit state in which the component or an assembly will can be deformed, combined with other component and/or assemble, and/or deleted.

The drawing controller 13 has a function for controlling a two-dimensional drawing. Specifically, the drawing controller 13 receives an operation from the user and performs corresponding processing in the two-dimensional space of a two-dimensional model to express a processed two-dimensional drawing. The drawing controller 13 realizes reading, editing, writing, and so on of the two-dimensional drawing. The drawing controller 13 can obtain information regarding an arbitrary two-dimensional drawing topology and update the obtained information, or can also generate information.

The 2D/3D-capable controller 14 has a function for controlling an association relationship between a two-dimensional element (a two-dimensional geometric element) and a three-dimensional element (a three-dimensional geometric element). More specifically, the 2D/3D-capable controller 14 generates and records information indicating an association relationship between a two-dimensional element in the two-dimensional space of a two-dimensional drawing generated at the time of projection processing and a three-dimensional element. The information indicating an association relationship between a two-dimensional element and a three-dimensional element is, for example, a combination of two-dimensional element identification information (two-dimensional drawing topology identification information) and three-dimensional element identification information (three-dimensional drawing topology identification information) corresponding thereto. The generated information indicating the association relationship can be recorded independently, and can also be recorded in CAD data or drawing data during the generation. In this case, since drawing data is generated or updated for each projection, it is desired that the information indicating the association relationship be also recorded in the drawing data.

[2. Operation]

When the user edits a three-dimensional model (see FIG. 3: a tree shown in the figure schematically indicates an assembly tree, where "ASM" means "Assembly" and M1, M2, and M3 shows components constituting the assembly.) and gives an instruction for projection processing by using the input devices 122 and 123 so as to create a two-dimensional drawing that is a projection drawing, next projection processing is performed. During the issuance of the instruction, a three-dimensional model in an edit state becomes a candidate to be projected. For example, as shown in FIG. 4, components at two-opposite ends are put in the edit state. Thus, a single component or assembly, other than a collection of components, is put into the edit state.

Figure 5:
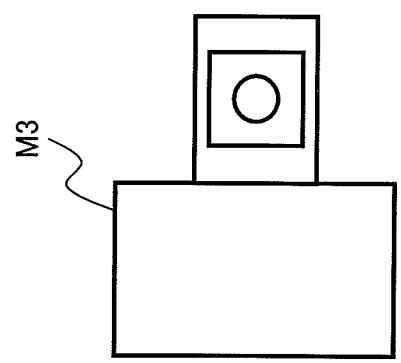
FIG. 5 is a two-dimensional drawing resulting from the projection processing for the specified components in FIG. 4.
Figure 5:
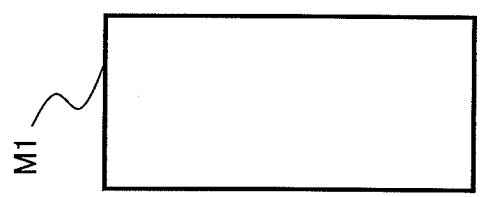

A projection drawing used for the projection processing can also be designated. The projection drawing designation does not necessarily have to be performed, and it is sufficient if the designation is performed by the time of step 130 described below. It is assumed in this case that the projection drawing designation is performed together with the designation of a three-dimensional model during the issuance of the instruction for the projection processing. FIG. 5 shows the projection drawing specified in this case.

The reason why the three-dimensional model in the edit state remains as a candidate to be projected and does not directly become an object to be projected is that there are cases in which an object to be projected may be changed based on the obtained projection drawing. When the three-dimensional model in the edit state and a three-dimensional model projected on the obtained projection drawing are the same, the three-dimensional model in the edit state becomes an object to be projected. That is, the logical AND of the three-dimensional model in the edit state and the three-dimensional model projected on the obtained projection drawing becomes a three-dimensional model to be projected. Dimension lines added to the three-dimensional model to be projected are projected.

Figure 6:
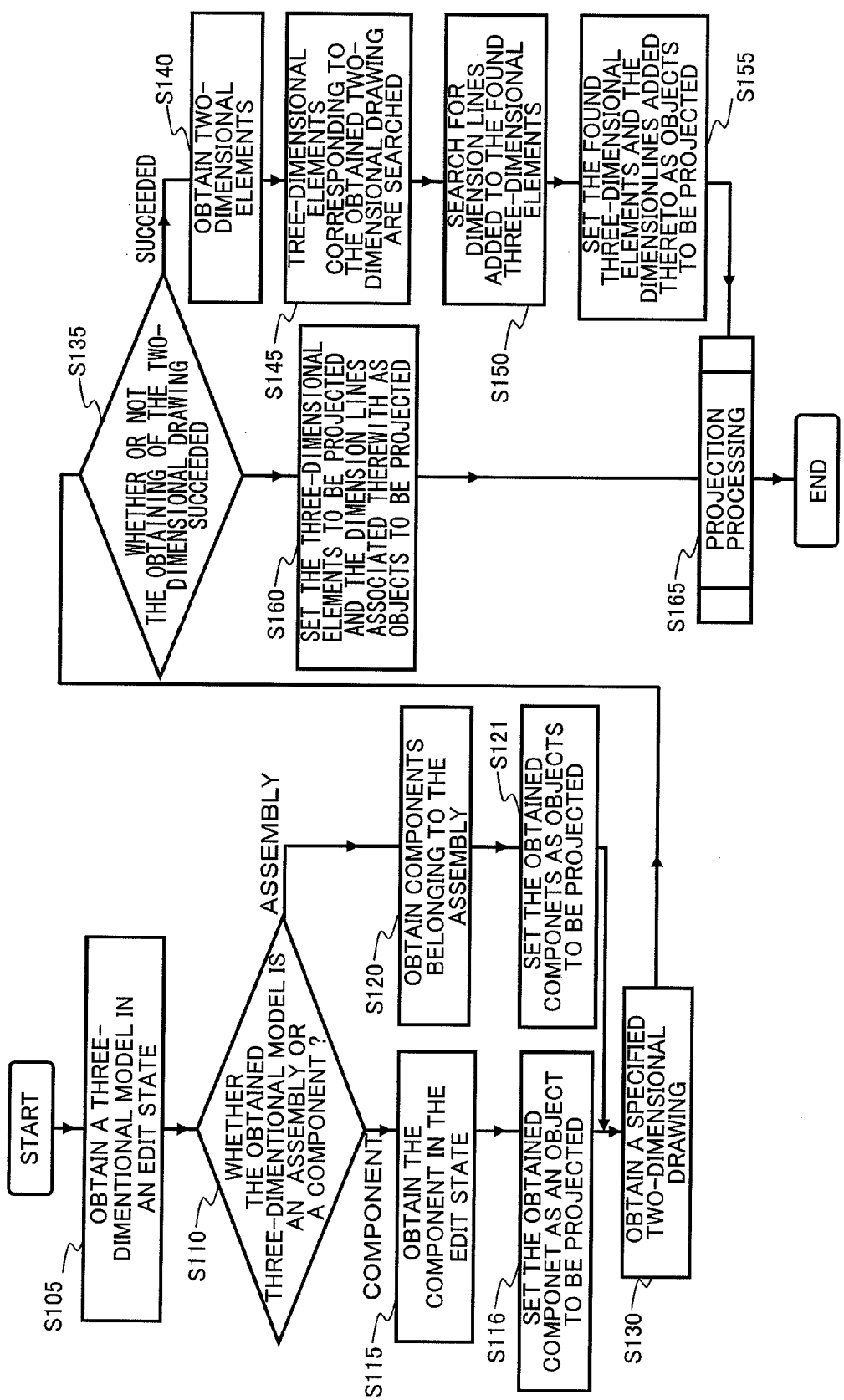
FIG. 6 is a flowchart of projection processing of the CAD system according to the first embodiment of the present invention.

FIG. 6 is a flowchart of the projection processing of the CAD system according to the present embodiment.

In response to a projection processing request to the projection processing controller 11, the model controller 12 obtains a three-dimensional model in an edit state from three-dimensional models (step S105). The projection processing controller 11 determines whether the obtained three-dimensional model is an assembly or a component (step S110). Upon determining that the three-dimensional model is a component, the projection processing controller 11 obtains the component in the edit state (step S115) and sets the obtained component as an object to be projected (step S116).

When it is determined in step S110 described above that the obtained three-dimensional model is an assembly, the projection processing controller 11 obtains components belonging to the assembly (step S120), and sets the obtained components as objects to be projected (step S121). The projection processing controller 11 obtains a specified two-dimensional drawing (step S130). The projection processing controller 11 determines whether or not the obtaining of the two-dimensional drawing succeeded (step S135).

Figure 7:
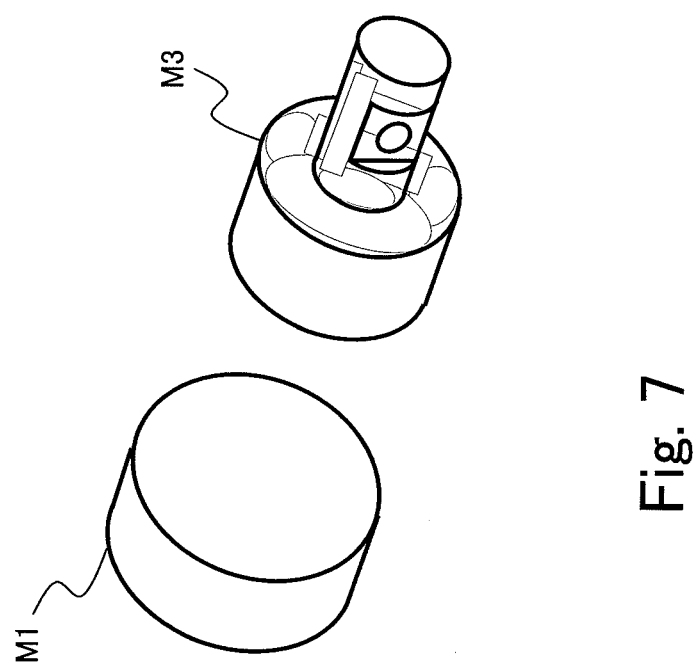
FIG. 7 shows components in a three-dimensional model which correspond to the components drawn in the two-dimensional drawing shown in FIG. 5.
Figure 8:
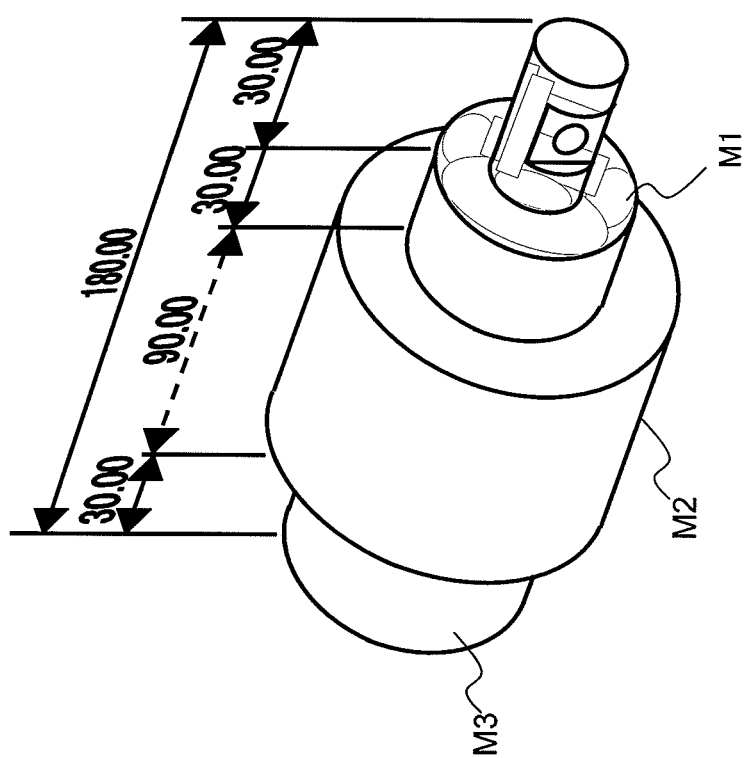
FIG. 8 is a diagram illustrating dimensions associated with the components in the three-dimensional model which correspond to the components drawn in the two-dimensional drawing shown in FIG. 5.

When it is determined in step S135 that the obtaining of the two-dimensional drawing succeeded, a two-dimensional element in the two-dimensional drawing obtained by the drawing controller 13 is obtained (step S140). Based on the information that is held by the 2D/3D-capable controller and that indicates an association relationship between the two-dimensional element and the three-dimensional element, three-dimensional elements corresponding to the obtained two-dimensional drawing are searched for from the components set as objects to be projected (step S145). FIG. 7 shows an example of a three-dimensional model resulting from the searching. The model controller 12 searches for dimension lines added to the found three-dimensional elements (step S150). FIG. 8 is an example of the three-dimensional model showing scales lines resulting from the searching (an unnecessary dimension line is indicated by a dotted line in the three-dimensional model space). The projection processing controller 11 sets the found three-dimensional elements and the dimension lines added thereto as objects to be projected (step S155).

Figure 9:
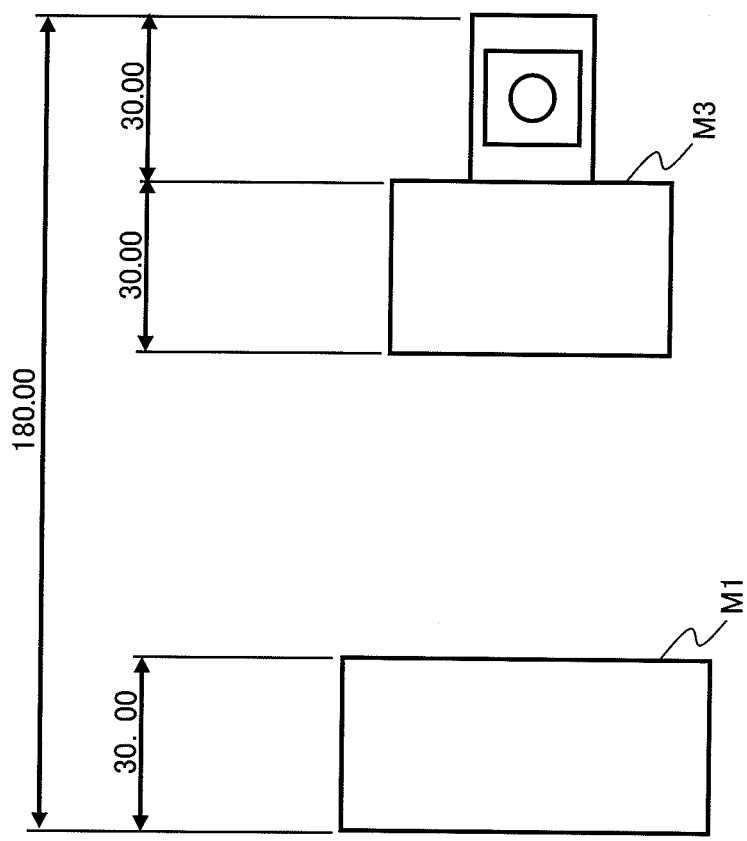
FIG. 9 is a two-dimensional drawing including the three-dimensional model (FIG. 8) to which the dimensions are added and necessary dimension lines created from the two-dimensional drawing (FIG. 5) resulting from the partial projection processing.
Figure 10:
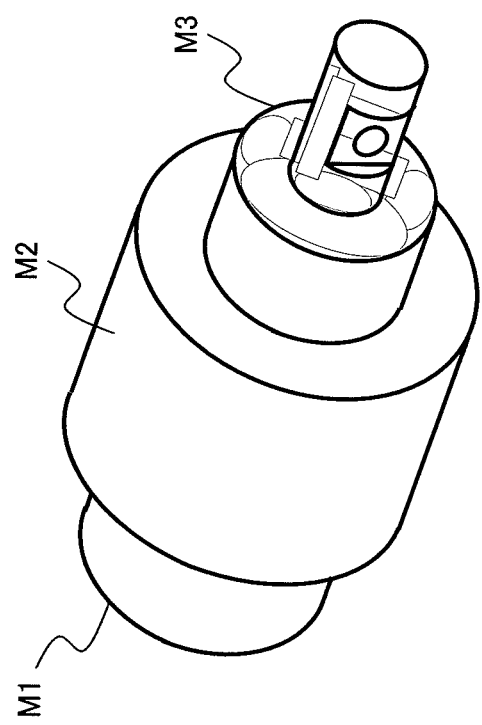
FIG. 10 is an example of a three-dimensional model in a CAD system of a background technology.
Figure 11:
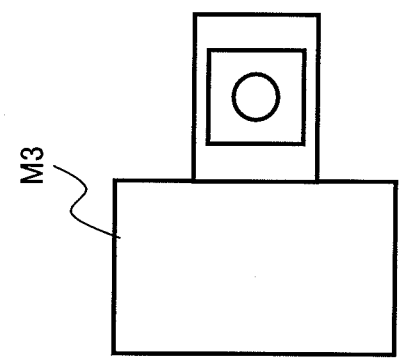
FIG. 11 is a two-dimensional drawing obtained by performing projection processing on FIG. 10.
Figure 11:
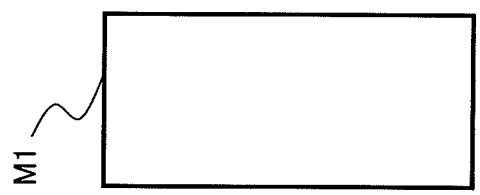
Figure 12:
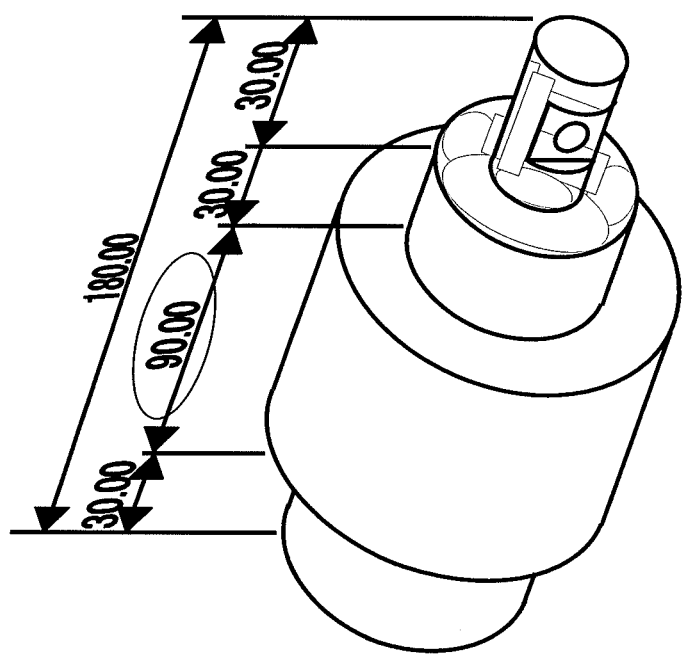
FIG. 12 is an example in which dimension lines are added to the three-dimensional model in FIG. 10.
Figure 13:
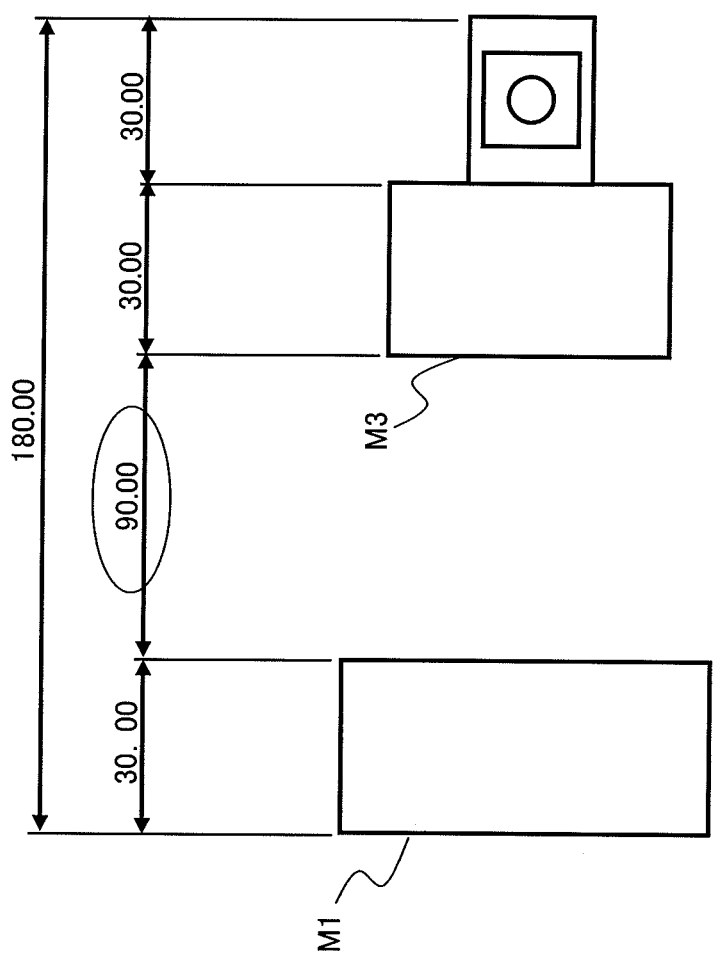
FIG. 13 is a two-dimensional drawing obtained by performing projection processing on the three-dimensional model to which the dimensions are added in FIG. 12.

The projection processing controller 11 projects the three-dimensional elements to be projected and the dimension lines added thereto (step S165). FIG. 9 is an example of a two-dimensional drawing after the projection processing. When the obtaining of the two-dimensional drawing fails in step S135 described above, the projection processing controller 11 sets the three-dimensional elements to be projected and the dimension lines associated therewith as objects to be projected (step S160), and the process proceeds to step S165 described above.

The configuration may also be such that the projection drawing obtained in step S130 is presented to the user for approval. When the obtained projection drawing name and/or the projection drawing is displayed and the user's approval is received, the process proceeds to the subsequent processing. When the projection drawing cannot be obtained, information indicating so is displayed. The configuration may also be such that when the user's approval cannot be obtained, a projection drawing is designated or the projection processing is suspended. During the designation of the projection drawing, "no designation" from the obtained projection drawing can also be selected. In this case, the process inevitably proceeds to step S160 via step S135.

The configuration may also be such that a three-dimensional model including only three-dimensional elements associated with the two-dimensional elements resulting from the searching performed in step S145 described above is output to a display device 131 or a file for checking after step S145 (see FIG. 7).

The configuration may also be such that, in step S150 described above, the dimension lines associated with the three-dimensional elements resulting are output to the display device 131 or a file for checking after step S150 (see FIG. 8).

As described above, according to the present embodiment, three-dimensional elements that constitute an component in an editing state or components belonging to an assembly and that are projection sources of two-dimensional elements in an already-projected projection drawing and scale lines therefore are projected, so that a projection drawing to which unnecessary scale lines are not added and necessary scale lines are added can be obtained.

In the configuration of the present embodiment, when the projection drawing cannot be obtained in step S135, the three-dimensional model in the edit state, the three-dimensional model being to be advanced to step S160, is set as an object to be projected. However, the process may proceeds from step S135 to the end without performing the projection processing.

In the present embodiment, after components in an edit state are obtained (or may be, after the obtained components are set as objects to be projected), a determination may be determined as to whether or not a dimension line exists on three-dimensional elements of the obtained components. When no line exists, the process proceeds to S160, and when a dimension line exists, processing as described above can be performed. In addition, the arrangement may also be such that, when no dimension line exists, known general projection processing is performed or is not performed.

In the present embodiment, the user specifies the projection drawing to be obtained in step S130. Alternatively, the arrangement can also take a form in which information indicating an association relationship between a three-dimensional model in an edit state and a projection drawing is pre-recorded when the projection drawing is created, the projection drawing is identified from the three-dimensional model in the editing state and the recorded information indicating the association relationship between the three-dimensional model and the projection drawing before the projection is obtained in step S130, and the identified projection drawing is obtained in step S130.

Although the present invention has been described in conjunction with the embodiments described above, the technical scope of the present invention is not limited to the scope of the descriptions of the embodiments and various changes or improvements can be made to the embodiments. Embodiments to which such changes or improvements are made are also encompassed by the technical scope of the present invention. This is apparent from the claims and the means for solving the problems.

What is claimed is:

1. A method of projecting a three dimensional figure to a two dimensional figure, the method being performed by a computer, comprising:

selecting, by the computer, a data set of three dimensional figures out of a stored data set of three dimensional figures, wherein the data set of three dimensional figures is related to an associated dimensional line and other three dimensional figures, wherein the data set is set in an edit mode for accepting an operation by a user;

determining whether a data set of both ends of the dimensional line is associated with the three dimensional figure or the three dimensional figures, the three dimensional figure and figures being selected and being in the edit mode;

obtaining two dimensional figures through performing a projection of the data set of three dimensional figures and the dimensional line onto a two dimensional plane in the case where the data set of both ends of the dimensional line is associated with the three dimensional figures.

2. A method of projecting a three dimensional figure to a two dimensional figure according to claim 1, further comprising:

synthesizing two dimensional projected figures having the dimensional line on the basis of the obtained data of three dimensional figures and the dimensional line associated with the three dimensional figures.

3. A computer aided design system projection method for projecting a three dimensional element in a three dimensional model in a three dimensional space to a two dimensional element in a two dimensional plane, the method being performed by a computer, the method comprising:

receiving a projection instruction;

selecting a first three dimensional model which is in an edit state for being edited by a user when the projection instruction is received;

determining, performed by the computer, whether the first three dimensional model in the three dimensional space is an assembly or a first component;

editing the first three dimensional model to exclude at least one component;

wherein when it has been determined that the first three dimensional model is an assembly, obtaining the first component and a second component included in the assembly when the first three dimensional model is the assembly;

obtaining the two dimensional element corresponding to the first or second component by projecting the first three dimensional model onto the two dimensional plane;

searching the three dimensional element responsive to the obtained two dimensional element according to information indicating an association relationship between the obtained two dimensional element and the three dimensional element included in the first three dimensional model;

searching a dimension line according to the searched three dimensional element; and projecting the three dimensional element and the searched dimension line onto the two dimensional plane, wherein the projected three dimensional element lacks the component excluded during the editing, as well as a dimension line associated with the excluded component, but wherein the relative locations of the components projected onto the two dimensional plane are the same as if the component excluded were being projected onto the two dimensional plane.

4. The computer aided design system projection method according to claim 3, further comprising:

storing information indicating an association relationship between the two dimensional element and the three dimensional element responsive to the two dimensional element.

5. The computer aided design system projection method according to claim 3, further comprising:

projecting the three dimensional element and the dimension line of either the first or second component according to whether the three dimensional model is the first component or the assembly when the first three dimensional model has failed to be projected onto the two dimensional plane.

6. The computer aided design system projection method according to claim 5, further comprising:

storing information indicating an association relationship between the two dimensional element and the three dimensional element associated with the two dimensional element.

7. The computer aided design system projection method according to claim 5, further comprising:

storing information indicating the association relationship between the first three dimensional model and the projected first three dimensional model onto the two dimensional plane;

identifying the projected first three dimensional model onto the two dimensional plane from information indicating an association relationship between the first three dimensional model and the projected first three dimensional model onto the two dimensional plane; and obtaining the identified the projected first three dimensional model onto the two dimensional plane.

8. The computer aided design system projection method according to claim 5, further comprising:

determining whether or not the dimension line is added to the three dimensional element of the first three dimensional model in the edit state; and stopping a processing subsequent to the step of determining whether or not the three dimensional model in the three dimensional space is an assembly or a first component.

9. The computer aided design system projection method according to claim 3, further comprising:

storing information indicating the association relationship between the first three dimensional model and the projected first three dimensional model onto the two dimensional plane;

identifying the projected first three dimensional model onto the two dimensional plane from information indicating an association relationship between the first three dimensional model and the projected first three dimensional model onto the two dimensional plane; and obtaining the identified the projected first three dimensional model onto the two dimensional plane.

10. The computer aided design system projection method according to claim 3, further comprising:

determining whether or not the dimension line is added to the three dimensional element of the first three dimensional model; and stopping a processing subsequent to the step of determining whether or not the three dimensional model in the three dimensional space is an assembly or a first component.

11. The computer aided design system projection method according to claim 3, further comprising:

determining whether or not the projected first three dimensional model onto plane is obtained in the obtaining the first component when the first three dimensional model is the first component;

projecting the three dimensional element and the dimension line responsive the three dimensional element, when the projected first three dimensional model onto plane is not obtained, the three dimensional element and the dimension line being responsive to the first component; and obtaining the two dimensional element in the projected first three dimensional model onto plane when the projected first three dimensional model onto plane is obtained, wherein the searching for the three dimensional element, the searching for the dimension line, and the projecting the three dimensional element and the dimension line are performed.

12. The computer aided design system projection method according to claim 3, wherein the first three dimensional model is not projected when the first three dimensional model is out of the edit state.

13. A computer program product comprising a computer readable medium having computer program logic recorded thereon for enabling a processor in a computer aided design system, the computer readable medium being non-transitory, the computer logic comprising:

receiving a projection instruction;

selecting a first three dimensional model which is in an edit state for being edited by a user when a projection instruction is received;

determining, performed by the computer, whether the first three dimensional model in the three dimensional space is an assembly or a first component;

editing the first three dimensional model to exclude at least one component;

wherein when it has been determined that the first three dimensional model is an assembly, obtaining the first component and a second component included in the assembly when the first three dimensional model is the assembly;

obtaining the two dimensional element corresponding to the first or second component by projecting the first three dimensional model onto the two dimensional plane;

searching the three dimensional element responsive to the obtained two dimensional element according to information indicating an association relationship between the obtained two dimensional element and the three dimensional element included in the first three dimensional model;

searching a dimension line according to the searched three dimensional element; and projecting the three dimensional element and the searched dimension line onto the two dimensional plane, wherein the projected three dimensional element lacks the component excluded during the editing, as well as a dimension line associated with the excluded component, but wherein the relative locations of the components projected onto the two dimensional plane are the same as if the component excluded were being projected onto the two dimensional plane.

14. A computer aided design system for projecting a three dimensional element in a three dimensional model in a three dimensional space to a two dimensional element in a two dimensional space and recording information indicating an association relationship between the two dimensional element and the projection source three dimensional element during the projection, the method system comprising:

a selector configured to select a first three dimensional model which is in an edit state for being edited by a user when a projection instruction is received;

a determiner configured to determine whether a first three dimensional model in the three dimensional space is an assembly or a first component;

an editor configured to edit the first three dimensional model to exclude at least one component;

wherein when it has been determined that the first three dimensional model is an assembly, an obtainer is configured to obtain the first component and a second component included in the assembly when the first three dimensional model is the assembly;

a third obtainer configured to obtain the two dimensional element corresponding to the first or second component by projecting the first three dimensional model onto the two dimensional plane;

a first searcher configured to search the three dimensional element responsive to the obtained two dimensional element, according to information indicating an association relationship between the obtained two dimensional element and the three dimensional element included in the first three dimensional model;

a second searcher configured to search a dimension line according to the searched three dimensional element; and a projector configured to project the three dimensional element and the searched dimension line onto the two dimensional plane, wherein the projected three dimensional element lacks the component excluded by the editor, as well as a dimension line associated with the excluded component, but wherein the relative locations of the components projected onto the two dimensional plane are the same as if the component excluded were being projected onto the two dimensional plane.

* * * * *